United States Patent
Kenworthy et al.

(10) Patent No.: US 6,235,097 B1
(45) Date of Patent: May 22, 2001

(54) PHTHALOCYANINE COMPOUNDS USED IN INKS FOR INK JET PRINTING

(75) Inventors: Mark Kenworthy; Peter Gregory, both of Blackley (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/486,832

(22) PCT Filed: Aug. 24, 1998

(86) PCT No.: PCT/GB98/02545

§ 371 Date: Mar. 2, 2000

§ 102(e) Date: Mar. 2, 2000

(87) PCT Pub. No.: WO99/13009

PCT Pub. Date: Mar. 18, 1999

(30) Foreign Application Priority Data

Sep. 5, 1997 (GB) .................................. 9718876

(51) Int. Cl.$^7$ ............................ C09D 11/02; C09B 47/04
(52) U.S. Cl. ................... 106/31.49; 106/31.78; 106/410; 106/413; 540/133; 540/134
(58) Field of Search ............... 106/31.49, 31.78, 106/410, 413; 540/133, 134

(56) References Cited

U.S. PATENT DOCUMENTS

| | | | |
|---|---|---|---|
| 5,102,459 | * | 4/1992 | Ritter et al. ............... 106/31.51 |
| 5,123,960 | * | 6/1992 | Shirota et al. .............. 106/31.49 |
| 5,542,972 | * | 8/1996 | von der Eltz et al. ........ 106/31.49 |

FOREIGN PATENT DOCUMENTS

| | | |
|---|---|---|
| 11 79 317 | 10/1964 | (DE) . |
| 28 42 187 A1 | 4/1980 | (DE) . |
| 0 312 004 A2 | 4/1989 | (EP) . |
| 0 418 792 A1 | 3/1991 | (EP) . |
| 0684 292 A1 | 11/1995 | (EP) . |
| 97/13813 | 4/1997 | (WO) . |

OTHER PUBLICATIONS

Derwent abstract of DE2842187, 4/1980.*
Database WPI, Week 8624, Derwent Publications Ltd., London,GB; AN86–153459'24 ! XP002084251, S. Yamamura; Y. Hirasawa: "Ink composition with blue–coloring and low water–solubility" & JP61 087759 A (Nippon Kayaku KK) May 6, 1986 cited in the application see abstract & JP 61 087759 A (Nippon Kayaku KK) see formulas, May 1986.
Chemical Abstracts, vol.81, No. 20, Nov. 18, 1974 Columbus, Ohio, US; abstract No. 122791b, D.S. Rao et al.: "Phthalocyanine dyes" p. 134; column 1; XP002084250 see abstract & IN 100 197 A.

* cited by examiner

Primary Examiner—Helene Klemanski
(74) Attorney, Agent, or Firm—Pillsbury Winthrop LLP

(57) ABSTRACT

Suitable phthalocyanine compounds of Formula (1) have utility as colorants in inks for ink-jet printing, where Formula (1) represents:

Formula (1)

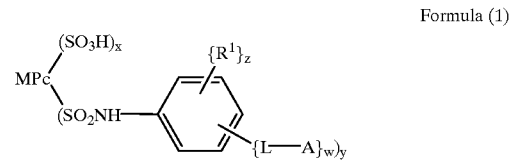

which comprises any form of the compound: such as salt; stereoisomer, zwitterion, polymorph, complex, isotopic form, combinations thereof in the same species and mixtures thereof; where:

M represents a metal or H;

Pc represents a phthalocyanine nucleus of Formula (2):

Formula (2)

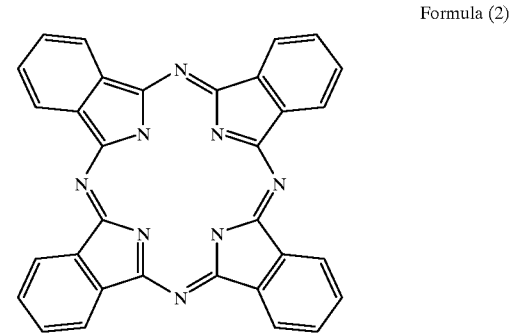

L represents a linking group comprising an optionally substituted $C_{1-30}$hydrocarbyl;

A represents a group comprising at least one of: amino and optionally substituted $C_{1-30}$hydrocarbyl comprising at least one protonable nitrogen atom; but where A comprises other than an alkyl group substituted by at least one of: hydroxy, carboxy and sulpho;

$R^1$ represents a group independently comprising at least one of: an optional substituent and optionally substituted $C_{1-5}$hydrocarbyl;

z represents an integer from 0 to 4; w represents an integer from 1 to 5; and the sum of w+z is from 1 to 5; and x and y each independently represent a non-zero number; and the mean of the sum of x+y is from about 1 to about 6;

where the optional substituents comprise at least one of: carboxy, sulpho, hydroxy, amino, mercapto, cyano, nitro and halo.

14 Claims, No Drawings

PHTHALOCYANINE COMPOUNDS USED IN INKS FOR INK JET PRINTING

This application is the national phase of international application PCT/GB98/02545 filed Aug. 24, 1998 which designated the U.S.

This invention relates to compounds, to ink compositions comprising them and to the use of such inks in ink jet printing ("IJP"). IJP is a non-impact printing technique in which droplets of ink are ejected through a fine nozzle onto a substrate without bringing the nozzle into contact with the substrate.

There are many demanding performance requirements for colorants and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

The compounds listed below are known from the prior art:

EP 0684292 discloses the following compounds (where Pc is a phthalocyanine nucleus as defined below):

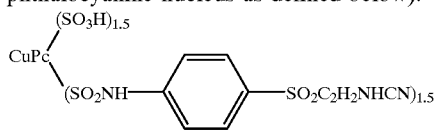

Chemical Abstracts (CAS) 105038-63-9 discloses a compound of Formula I:

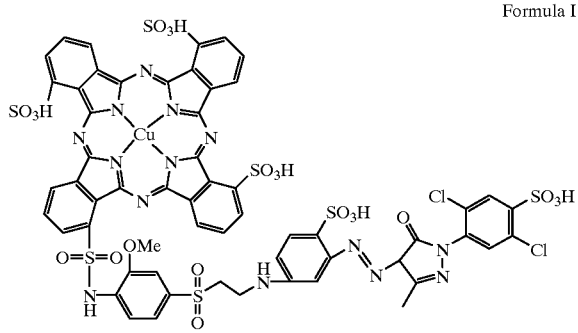

Formula I

CAS 104994-17-4 discloses a compound of Formula II:

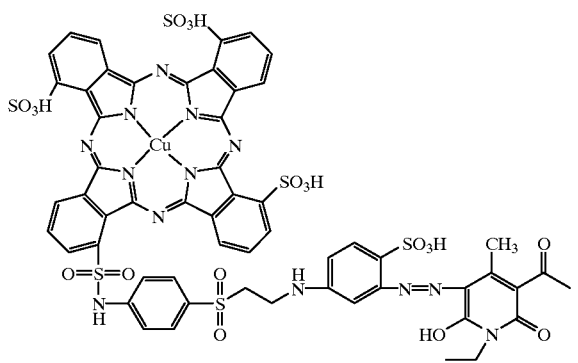

Formula II

CAS 104994-15-4 discloses a compound of Formula III:

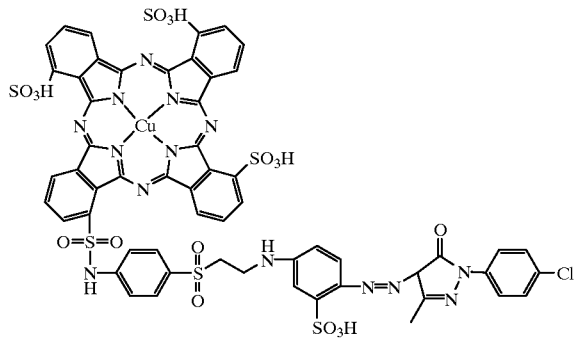

Formula III

The preceding compounds are known per se but are not known for use as colorants in IJP.

Surprisingly, the applicant has discovered that certain phthalocyanine compounds have particular utility as colorants for use in IJP as they may produce prints with unexpectedly good optical density, light fastness and/or water fastness.

According to the present invention there is provided at least one compound of Formula (1):

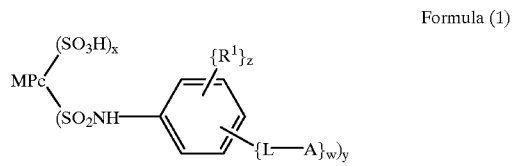

Formula (1)

which comprises any form of the compound: such as salt; stereoisomer, zwitterion, polymorph, complex, isotopic form, combinations thereof in the same species and mixtures thereof; where:

M represents a metal or H;
Pc represents a phthalocyanine nucleus of Formula (2):

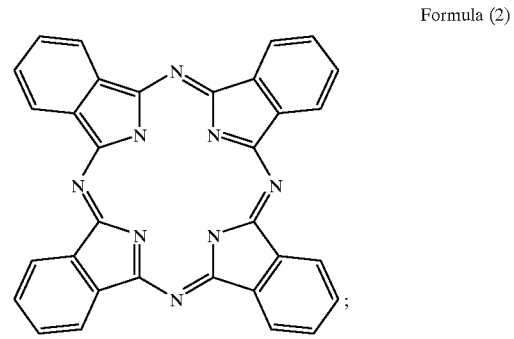

Formula (2)

L represents a linking group comprising an optionally substituted $C_{1-30}$hydrocarbyl;
A represents a group comprising at least one of: amino and optionally substituted $C_{1-30}$hydrocarbyl comprising at least one protonable nitrogen atom; but where A comprises other than an alkyl group substituted by at least one of: hydroxy, carboxy and sulpho;
$R^1$ represents a group independently comprising at least one of: an optional substituent and optionally substituted $C_{1-15}$hydrocarbyl;

z represents an integer from 0 to 4; w represents an integer from 1 to 5; and the sum of w+z is from 1 to 5; and x and y each independently represent a non-zero number; and the mean of the sum of x+y is from about 1 to about 6;

where the optional substituents comprise at least one of: carboxy, sulpho, hydroxy, amino, mercapto, cyano, nitro and halo;

with the provisos that:

when M is Cu; x and y are both 1.5; z is 0, w is 1 and L is p-$SO_2C_2H_4$ then A is other than —NHCN; and Formula (1) is other than a compound selected from: Formulae I, II and III as defined herein and proton salts thereof.

The term "hydrocarbyl" as used herein denotes any radical moiety which comprises one or more hydrogen atoms with one or more carbon atoms and optionally one or more other suitable heteroatoms, preferably nitrogen, oxygen and/or sulphur. More preferably the term 'hydrocarbyl' comprises any of the following moieties and combinations thereof in the same moiety: alkyl, alkoxy, alkanoyl, carboxy, alkanoyloxy, alkylthio, alkylsulphinyl, alkylsulphonyl, carbamoyl, sulphamoyl, alkylamino, and/or alkanoylamino. Hydrocarbyl moieties may also comprise one or more double and/or triple carbon to carbon bonds and/or aromatic moieties. It will be understood that the terms 'alkyl' or its equivalents (e.g. 'alk') as used above may be readily replaced where appropriate by terms encompassing moieties comprising double bonds, triple bonds and/or aromatic moieties (e.g. alkenyl, alkynyl and/or aryl). The term 'halo' as used herein signifies fluoro, chloro, bromo and iodo, preferably fluro and chloro.

Any radical group mentioned herein as a substituent refers to a monovalent radical unless otherwise stated. A group which comprises a chain of three or more atoms signifies a group in which the chain wholly or in part may be linear, branched and/or form a ring (including spiro and/or fused rings). The total number of certain atoms is specified for certain substituents for example $C_{1-n}$hydrocarbyl, signifies an hydrocarbyl moiety comprising from 1 to n carbon atoms. In any of the formulae drawn herein if one or more ring substituents are not indicated as attached to any particular atom on the ring [for example the substituent $R^1$ in Formula (1)] the substituent may replace any H attached to an atom in the ring and may be located at any available position on the ring which is chemically suitable.

According to a further feature of the present invention there is provided an ink suitable for use in IJP comprising a suitable medium and a colorant comprising a suitable compound of Formula (3):

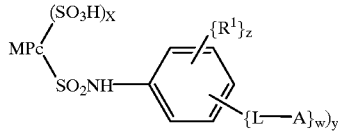

Formula (3)

which comprises any suitable form of the compound: such as salt; stereoisomer, zwitterion, polymorph, complex, isotopic form, combinations thereof in the same species and mixtures thereof; where:

M represents a suitable metal or H;

Pc represents a phthalocyanine nucleus of Formula (2) as defined herein;

L represents a suitable linking group comprising an optionally substituted $C_{1-30}$hydrocarbyl;

A represents a group comprising at least one of: amino and optionally substituted $C_{1-30}$hydrocarbyl comprising at least one protonable nitrogen atom; but where A comprises other than an alkyl group substituted by at least one of: hydroxy, carboxy and sulpho;

$R^1$ represents a suitable group independently comprising at least one of: an optional substituent and optionally substituted $C_{1-15}$hydrocarbyl;

z represents an integer from 0 to 4; w represents an integer from 1 to 5; and the sum of w+z is from 1 to 5; and x and y each independently represent a non-zero number; and the mean of the sum of x+y is from about 1 to about 6;

where the optional substituents comprise at least one of: carboxy, sulpho, hydroxy, amino, mercapto, cyano, nitro and halo.

Preferably in the ink of the present invention the compounds of Formula (3) comprise dyes, more preferably dyes comprising a predominately cyan colour.

The terms 'acceptable' or 'suitable' (for example with reference to composition ingredients, substituents and/or compounds described herein) will be understood to mean suitable for use in IJP for example by providing desirable properties to the ink or being compatible with any inert carriers and/or diluents suitable for formulating such inks. In relation to the processes described herein suitable compounds are those which will, in addition, undergo the specified reactions. To be particularly acceptable for use in IJP compounds of Formulae (1) and (3) may be Ames negative.

In Formulae (1) and (3) when M is a metal it may be selected from any suitable metal or mixtures thereof in the same complex. The metal may exist in any suitable oxidation state and may be neutral or charged (i.e. an ion). The metal may also be bonded to one or more oxygen atoms. Preferred metals for M comprise Li, Na, K, Mg, Ca, Ba, Al, Si, Sn, Pb, Rh, Sc, Ti, V, Cr, Mn, Fe, Co, Ni and/or Cu, more preferably Sc, Ti, Va, Cr, Mn, Fe, Co, Zn, Ni and/or Cu and most preferably Ni and/or Cu. Especially preferred compounds of Formulae (1) and (3) are those in which M is Cu.

Preferred compounds of Formulae (1) and (3) are those in which: z is 0 or 1; when z is 1, $R^1$ represents a group independently selected from: carboxy, carboxy$C_{1-6}$alkyl, sulpho, $C_{1-6}$alkyl, $C_{1-6}$alkoxy, halo, cyano, nitro, amino, $C_{1-6}$alkylamino di($C_{1-6}$alkyl)amino, $C_{6-12}$arylamido (for example benzamido) and $C_{1-6}$alkylsulphamoyl;

L represents a $C_{1-15}$hydrocarbyl group;

A represents an optionally substituted group selected from: piperazinyl (optionally N-substituted by $R^2$); —$OR^3$; —$SR^3$; and amino optionally substituted by one or more $R^3$; where:

$R^2$ comprises $C_{1-6}$alkyl optionally substituted by one or more amino (the amino being optionally N-substituted by one or more $C_{1-6}$alkyl); and $R^3$ comprises $R^2$ and/or —$N(C_2H_2)_2Y$; where Y represents NH, $NR^2$ or O;

w is 1 and;

x and y each represent from 1 to 3 and the sum of x+y is from 1 to 4.

More preferred compounds of Formulae (1) and (3) are those preferred compounds in which M is Cu;
L represents sulphonyl$C_{1-15}$alkylene;
A comprises: piperazinyl$C_{1-4}$alkylamino; N,N-di$C_{1-4}$alkylamino$C_{1-4}$alkylamino; morpholino$C_{1-4}$alkylamino; and/or piperazinyl;
z is 0; and
x and y are both 2.

Specific compounds of Formulae (1) and (3) comprise those compounds exemplified herein; any suitable salts thereof, preferably the ammonium salts; and any suitable mixtures thereof.

Compounds of Formulae (1) and (3) may be in the form as shown in the structures herein (i.e. free acid form) but are preferably in the form of salts. Salts of Formulae (1) and (3) may be formed from one or more organic and/or inorganic bases and/or acids and compounds of Formulae (1) and (3) which are acidic and/or basic (for example acid and/or base addition salts). Salts of Formulae (1) and (3) comprise all acceptable salts that may be formed from monovalent and/or multivalent acids and/or bases. Salts of Formulae (1) and (3) also comprise all enantiomeric salts formed with acceptable chiral acids and/or bases and/or any mixtures of enantiomers of such salts (for example racemic mixtures). Preferred salts are alkali metal salts, especially lithium, sodium and potassium salts, ammonium and substituted ammonium salts. Especially preferred salts are salts with ammonia and volatile amines. The dyes may be converted into a salt using known techniques. The present invention comprises all acceptable salts of Formulae (1) and (3) and any suitable mixtures thereof.

Certain compounds of Formulae (1) and (3) may exist as one or more stereoisomers, for example, enantiomers, diastereoisomers, geometric isomers, tautomers, conformers and/or suitable combinations thereof possible in the same species. The present invention comprises all acceptable stereoisomers of compounds of Formulae (1) and (3) and any suitable mixtures thereof.

Certain compounds of Formulae (1) and (3) may exist as one or more zwitterions, for example, species which comprise two or more centres of ionic charge. The present invention comprises all acceptable zwitterions of Formulae (1) and (3) and any suitable mixtures thereof.

Certain compounds of Formulae (1) and (3) may exist as one or more polymorphs, for example, phases, crystalline forms, amorphous forms, solid solutions, interstitial compounds and/or any suitable mixtures thereof. The present invention includes all acceptable polymorphs of Formulae (1) and (3) and any suitable mixtures thereof.

Certain compounds of Formulae (1) and (3) may exist in the form of one or more other complexes in addition to the metal complexes shown herein, for example, chelates, solvates, other organometallic complexes, and/or complexes with other suitable ligands. Such complexes may be formed between an acceptable substrate in which the compound of Formulae (1) and (3) and/or the substrate may act as a ligand. The substrate may comprise one or more acceptable solvents to form solvates. The complexes may be non-stoichiometric, for example if the complex is a hydrate it may comprise a hemihydrate, monohydrate and/or dihydrate. The present invention includes all acceptable complexes of Formulae (1) and (3) and any suitable mixtures thereof.

Certain compounds of Formulae (1) and (3) may exist as one or more isotopic forms in which one or more atoms in Formulae (1) and (3) comprise one or more suitable isotopes. The natural ratios of various isotopes may be altered by suitable means, for example certain $^{12}C$ atoms in certain compounds of Formulae (1) and (3) may be substantially replaced by the less common $^{14}C$ and/or $^{13}C$ isotopes. Optionally certain isotopic forms of Formulae (1) and (3) may be radio-active. Certain of the isotopic forms of Formulae (1) and (3) may be used as means for selective imaging in imaging devices (for example devices using X-rays, positron emission tomography and/or nuclear magnetic resonance); and/or as tools to investigate the mode of action of compounds of Formulae (1) and (3) in IJP. The present invention includes all acceptable, isotopic forms of Formulae (1) and (3) and any suitable mixtures thereof.

The present invention relates to all compounds of Formula (1) even those which may not be directly acceptable for use in IJP because they exhibit undesirable properties. Such compounds may nevertheless have utility in the field of the present invention for example as intermediates in the preparation and/or purification of acceptable compounds of Formulae (1) and (3) and/or as research tools and/or diagnostic aids in relation to IJP.

Compounds of Formulae (1) and (3) may be prepared the methods described below and by other suitable methods analogous to those described in the art for similar phthalocyanine compounds.

A preferred method for preparing compounds of Formulae (1) and (3) in which L is $SO_2C_2H_4$ comprises reacting compounds of Formula (4):

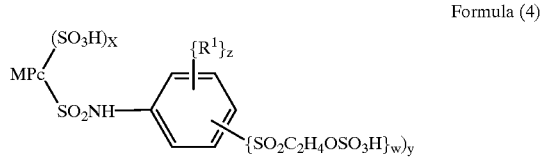

Formula (4)

with compounds of formula AH where Pc, $R^1$ and A are as defined above. Compounds of Formula (4) in which M is Cu, z is 0 and w is 1 are available commercially.

The reactions leading to the formation of the present compounds may be performed under conditions that have been described in the art and compounds of Formulae (1) and (3) may be isolated by known methods such as spray drying or precipitation followed by filtration.

Preferably the ink of the present invention comprises:
(a) from 0.01 to 30 parts of the compound of the Formula (3); and
(b) from 70 to 99.99 parts of a liquid medium or a low melting point solid medium; wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the colorant precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise:

$C_{1-6}$alkanols, preferably methanol, ethanol, n-propanol, isopropanol, n-butanol, sec-butanol, tert-butanol, n-pentanol, cyclopentanol and/or cyclohexanol;

linear amides, preferably dimethylformamide and/or dimethylacetamide; ketones and/or ketone-alcohols, preferably acetone, methyl ether ketone, cyclohexanone and/or diacetone alcohol;

water-miscible ethers, preferably tetrahydrofuran and/or dioxane;

diols, preferably $C_{2-12}$diols (for example pentane-1,5-diol, ethylene glycol, propylene glycol, butylene glycol, pentylene glycol, hexylene glycol and/or thiodiglycol) and/or oligo- and/or poly-alkyleneglycols (for example diethylene glycol, triethylene glycol, polyethylene glycol and/or polypropylene glycol);

triols, preferably glycerol and/or 1,2,6-hexanetriol;

$C_{1-4}$alkyl ethers of diols, preferably mono$C_{1-4}$alkyl ethers of $C_{2-12}$diols: {for example 2-methoxyethanol, 2-(2-methoxyethoxy)ethanol, 2-(2-ethoxyethoxy)-ethanol, 2-[2-(2-methoxyethoxy)ethoxy]-ethanol, 2-[2-(2-ethoxyethoxy)-ethoxy]-ethanol and/or ethyleneglycol monoallyl ether};

cyclic amides, preferably 2-pyrrolidone, N-methyl-2-pyrrolidone, N-ethyl-2-pyrrolidone, caprolactam and/or 1,3-dimethylimidazolidone;

cyclic esters, preferably caprolactone;

sulphoxides, preferably dimethyl sulphoxide and/or sulpholane; and/or any suitable mixtures thereof.

More preferred water-soluble organic solvents are selected from: cyclic amides (e.g. 2-pyrrolidone, N-methylpyrrolidone and N-ethyl-pyrrolidone);

diols, (e.g. 1,5-pentane diol, ethyleneglycol, thiodiglycol, diethyleneglycol and triethyleneglycol);

$C_{1-4}$alkyl ethers of diols (e.g. 2-methoxy-2-ethoxy-2-ethoxyethanol); and any suitable mixtures thereof.

A preferred liquid medium comprises:
(a) from 75 to 95 parts water; and
(b) from 25 to 5 parts in total of one or more solvents selected from:
diethylene glycol, 2-pyrrolidone, thiodiglycol, N-methylpyrrolidone, cyclohexanol, caprolactone, caprolactam and pentane-1,5-diol;
where the parts are by weight and the sum of the parts (a)+(b)=100.

Another preferred liquid medium comprises:
(a) from 60 to 80 parts water;
(b) from 2 to 20 parts diethylene glycol; and
(c) from 0.5 to 20 parts in total of one or more solvents selected from:
2-pyrrolidone, N-methylpyrrolidone, cyclohexanol, caprolactone, caprolactam, pentane-1,5-diol and thiodiglycol;
where the parts are by weight and the sum of the parts (a)+(b)+(c)=100.

Examples of further suitable media for inks of the present invention comprise a mixture of water and one or more organic solvents are described in U.S. Pat. No. 4,963,189, U.S. Pat. No. 4,703,113, U.S. Pat. No. 4,626,284 and EP 0425150-A.

When the liquid medium comprises an organic solvent free from water, (i.e. less than 1% water by weight) the solvent preferably has a boiling point of from 300 to 200° C., more preferably of from 400 to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The dye of Formula (3) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

A further aspect of the invention provides a process for printing an image on a substrate comprising applying to the substrate by means of an ink jet printer, an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper. Preferred papers are plain or treated papers which may have an acid, alkaline or neutral character.

A further aspect of the present invention provides a paper, an overhead projector slide or a textile material printed with an ink and/or a colorant as defined herein and/or by means of a process as defined herein.

When the substrate is a textile material the ink according to the invention is preferably applied thereto by:
i) applying the ink to the textile material using an ink jet printer; and
ii) heating the printed textile material at a suitable temperature, preferably from 50° C. to 250° C., to fix the ink on the material.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

The invention is further illustrated by the following Examples in which all parts and percentages are by weight unless otherwise stated.

EXAMPLE 1

Preparation of

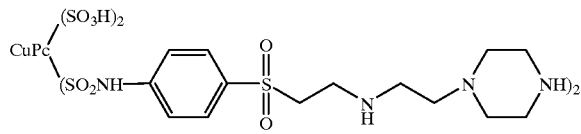

a) Preparation of

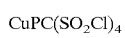

Copper phthalocyanine (115 g) was added in portions to stirred chlorosulphonic acid (310 ml) over 30 minutes keeping the temperature below 50° C. The mixture was stirred for 30 minutes at 50° C. before being heated gradually to 135–140° C. over one hour. The temperature of the mixture was maintained at 140° C. and it was stirred for 3 hours and then cooled to room temperature.

The mixture was heated to 45° C. and phosphorus trichloride (52.3 g) was added dropwise over 1 hour 15 minutes, whilst the temperature was kept at 45–50° C. The temperature of the mixture was raised to 90° C. and was maintained at this for 3 hours and then cooled to room temperature.

The resulting solution was poured onto a stirred mixture of ice (1 kg), water (200 ml), concentrated hydrochloric acid (44 ml) and sodium chloride (40 g) maintained at a temperature of 0° C. The precipitated product was collected by filtration at reduced pressure and washed with ice-cold hydrochloric acid solution (0.5 M, 2 l) to obtain a paste which was dried under reduced pressure to obtain CuPc $(SO_2Cl)_4$ which was used directly in the next step b) Preparation of

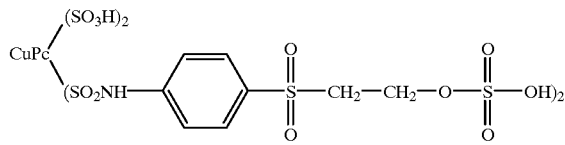

The sulphonyl chloride from step a) was added to a mixture of p-aminobenzenesulphatoethylsulphone (112.4 g) in water (500 ml) and ice (500 g). The mixture was stirred for 10–15 minutes and then the pH of the mixture was raised to 6.5–7.0 with caustic liquor. The mixture was stirred at room temperature for 18 hours whilst maintaining the pH at 7.0 by adding 2N NaOH. Sodium chloride (10% w/v) was added to the mixture which was stirred for 20 minutes and the pH of the mixture was adjusted to 2.5 with concentrated hydrochloric acid. The mixture was stirred for a further 30 minutes and the resultant precipitate was collected by filtration at reduced pressure and washed with ice cold brine (10%) and dried under reduced pressure to obtain 954.8 g of product.

c) Preparation of title compound.

The compound from step b) above (318 9) was stirred in distilled water (700 g) and the pH of the solution was adjusted to 6.5–7.0 with 2N NaOH. 1-(2-Aminoethyl) piperazine (34.05 g) was added to this solution and the mixture was heated to 80–85° C. and maintained at this temperature for 18 hours.

The mixture was cooled to room temperature and sodium chloride (20% w/v) was added and the pH of the mixture was adjusted to 7.0 with concentrated hydrochloric acid. The mixture was stirred and cooled to 10° C. and stirred at this temperature for a further 30 minutes. The resultant precipitate was collected by filtration at reduced pressure and washed with brine (20%) to obtain a paste which was dried at reduced pressure in an oven to given the title compound.

EXAMPLE 2

Preparation

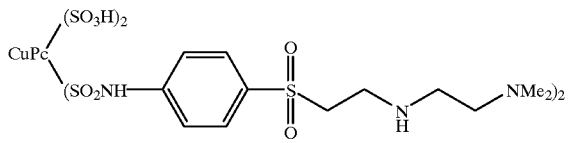

This compound was prepared as described in Example 1 substituting N,N-dimethylethylenediamine (23.18 g) for the 1-(2-aminoethyl)piperazine used in step 1c.

EXAMPLE 3

Preparation of

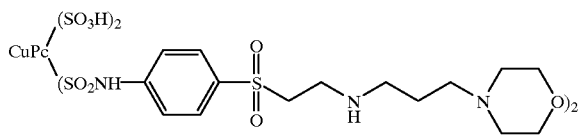

This compound was prepared as described in Example 1 substituting 4-(3-aminopropyl)morpholine (37.93 g) for the 1-(2-aminoethyl)piperazine used in step 1c.

EXAMPLE 4

Preparation of

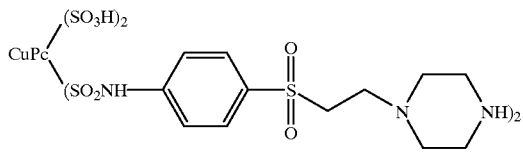

This compound was prepared as described in Example 1 substituting piperazine (22.65 g) for the 1-(2-aminoethyl)piperazine used in step 1c.

EXAMPLE 5

(S 171165)
Preparation of

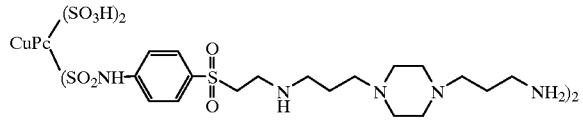

This compound was prepared as described in Example 1 substituting 1,4-bis(3-aminopropyl)piperazine (52.68 g) for the 1-(2-aminoethyl)piperazine used in step 1c.

Salts

The exemplified compounds 1 to 5, prepared as described above, were converted to their purified ammonium salts as follows. Each example was dissolved in distilled water. The solution was filtered and the volume of the filtrate adjusted to 4 l. The solution was desalinated by reverse osmosis. The dissolved sodium salt was converted into the ammonium salt by passing the solution through an ion-exchange column-comprising Dowex HGRW resin staturated with ammonia. The solution of the ammonium salt thus obtained was then filtered and water was evaporated form the filtrate to yield a purified ammonium salt suitable for use directly in an ink as described below.

Inks

The effectiveness in ink jet printing of compounds of Formula (1) was demonstrated as follows. Inks separately comprising each exemplified dye were prepared by dissolving 2 parts of the ammonium salt, prepared as described above, in 98 parts of a mixture of water and 2-pyrrolidone (in a respective ratio of 90:10 by volume). The inks were printed onto plain paper using a thermal ink-jet printer to give a bright cyan prints which had good optical density and excellent water and light fastness.

Further inks comprising the exemplified dyes may be may be prepared as described in the following tables in which the number in the first column (headed Ex. no.) denotes the example number of dye to be used in the ink. The dye may be in its free acid form and/or in the form of any suitable salt (e.g. ammonium salt). Numbers quoted in the second column onwards refer to the number of parts of the relevant ingredient and all parts are by weight. The inks may be applied to paper by thermal or piezo ink jet printing.

The following abbreviations are used in the tables:

| | | |
|---|---|---|
| PG = propylene glycol; | DEG = diethylene glycol; | NMP = N-methyl pyrollidone; |
| DMK = dimethylketone; | NaST = Na stearate | IPA = isopropanol; |
| MEOH = methanol; | 2P = 2-pyrrolidone; | MIBK = methylisobutyl ketone; |
| CET = cetyl ammonium bromide; | TBT = tertiary butanol; | TDG = thiodiglycol; |
| BDL = butane-2,3-diol; | PHO = Na$_2$HPO$_4$; | P12 = propane-1,2-diol. |
| CHL = cyclohexanol; and | PDL = pentan-1,5-diol. | |

TABLE I

| Ex. no. | Dye | Water | PG | DEG | NMP | DMK | MEOH | 2P | MIBK |
|---|---|---|---|---|---|---|---|---|---|
| 1 | 2.0 | 80 | 5 | | 6 | 4 | | 5 | |
| 2 | 10.0 | 85 | 3 | | 3 | 3 | 5 | 1 | |
| 3 | 2.1 | 91 | | 8 | | | | | 1 |
| 4 | 2.4 | 75 | 3 | 4 | | 5 | 6 | | 5 |
| 5 | 5.1 | 96 | | | | | 4 | | |
| 1 | 1.8 | 80 | | 5 | | | | 15 | |
| 2 | 2.6 | 84 | | | 11 | | | 5 | |
| 3 | 3.3 | 80 | 2 | | | 10 | 2 | | 6 |
| 4 | 5.4 | 69 | 2 | 20 | 2 | 1 | | 3 | 3 |
| 5 | 7.0 | 70 | | | 15 | | 3 | | 10 |

TABLE II

| Ex. No. | Dye | Water | PG | DEG | NMP | NaOH | Na ST | IPA | 2P | MIBK |
|---|---|---|---|---|---|---|---|---|---|---|
| 1 | 2.0 | 70 |  | 7 |  | 6 |  | 3 |  | 2 |
| 2 | 4.0 | 65 | 4 |  | 6 |  | 0.7 |  | 5 |  |
| 3 | 1.0 | 50 |  | 4 |  |  |  | 5 |  | 1 |
| 4 | 3.1 | 86 | 5 |  |  | 2 | 0.2 | 4 |  | 5 |
| 5 | 1.1 | 81 |  | 2 | 9 | 0.5 | 0.5 |  | 9 |  |

TABLE III

| Ex. no. | Dye | Water | PG | DEG | NMP | DMK | IPA | MEOH | 2P | MIBK |
|---|---|---|---|---|---|---|---|---|---|---|
| 1 | 3.1 | 86 | 5 |  |  |  | 4 |  |  | 5 |
| 2 | 1.1 | 81 |  |  | 9 |  |  |  | 9 |  |
| 3 | 2.5 | 60 | 4 | 15 | 3 | 3 | 6 | 10 | 5 | 4 |
| 4 | 3.2 | 65 |  | 5 | 4 | 6 | 5 | 4 | 6 | 5 |
| 5 | 10.0 | 80 | 2 | 6 | 2 | 5 | 1 |  | 4 |  |

TABLE IV

| Ex. no. | Dye | Water | PG | DEG | NMP | DMK | NaOH | Na ST | IPA |
|---|---|---|---|---|---|---|---|---|---|
| 1 | 3.0 | 90 |  | 5 | 5 |  | 0.2 |  |  |
| 2 | 5 | 65 | 5 | 20 |  |  |  |  | 10 |
| 3 | 4.1 | 80 |  | 5 | 2 | 10 |  | 0.3 |  |
| 4 | 10.8 | 90 | 5 |  |  |  |  |  | 5 |
| 5 | 12.0 | 90 |  |  |  | 7 | 0.3 |  | 3 |

TABLE V

| Ex. no. | Dye | Water | PG | DEG | NMP | CET | PHO | 2P | P12 |
|---|---|---|---|---|---|---|---|---|---|
| 1 | 3.0 | 80 | 15 |  |  | 0.2 |  | 5 |  |
| 2 | 9.0 | 90 |  | 5 |  |  | 1.2 |  | 5 |
| 3 | 2.5 | 90 |  | 6 | 4 |  | 0.12 |  |  |
| 4 | 3.1 | 82 | 4 | 8 |  | 0.3 |  |  | 6 |
| 5 | 10.0 | 91 |  |  | 6 |  |  | 3 |  |
| 1 | 5.0 | 78 | 5 | 11 |  |  |  |  | 6 |
| 2 | 6.0 | 63 | 3 |  | 4 |  | 2.0 |  |  |
| 3 | 3.0 | 72 |  | 15 |  | 0.8 |  |  | 3 |
| 4 | 5.4 | 86 | 5 |  | 7 |  | 3.0 | 7 |  |
| 5 | 2.0 | 90 |  | 10 |  |  |  |  | 10 |

TABLE VI

| Ex. no. | Dye | Water | PG | DEG | NMP | CET | TBT | TDG |
|---|---|---|---|---|---|---|---|---|
| 1 | 1.5 | 85 | 5 | 5 |  | 0.15 | 5.0 | 0.2 |
| 2 | 9.0 | 90 |  | 5 | 5 |  |  | 0.3 |
| 3 | 2.0 | 90 |  | 10 |  |  |  |  |
| 4 | 2.0 | 88 |  |  |  |  |  | 10 |
| 5 | 5.5 | 70 | 4 |  | 4 | 0.4 | 3 |  |

TABLE VII

| Ex. no. | Dye | Water | PG | DEG | NMP | TBT | TDG | BDL | PHO | 2P |
|---|---|---|---|---|---|---|---|---|---|---|
| 1 | 0.9 | 85 |  | 10 |  |  |  | 5 | 0.2 |  |
| 2 | 4.0 | 70 |  | 10 | 4 |  |  | 1 |  | 4 |
| 3 | 2.2 | 75 | 4 | 10 | 3 |  |  | 2 |  | 6 |
| 4 | 9.0 | 76 |  | 9 | 7 | 3.0 |  |  | 0.95 | 5 |
| 5 | 2.1 | 70 | 5 | 5 | 5 | 0.2 | 0.1 | 5 | 0.1 | 5 |

TABLE VIII

| Ex. no. | Dye | Water | PG | DEG | NMP | TBT | TDG | 2P |
|---|---|---|---|---|---|---|---|---|
| 1 | 3.0 | 55 | | | 5 | 2.0 | | 3 |
| 2 | 6.0 | 65 | | 4 | | 0.1 | 5 | |
| 3 | 5.0 | 78 | | | 5 | | 12 | 5 |
| 4 | 8.0 | 70 | 2 | | 8 | | 15 | 5 |
| 5 | 10.0 | 80 | | | | | 8 | 12 |

TABLE IX

| Ex. no. | Dye | Water | PG | DEG | NMP | BDL | PHO | 2P | P12 |
|---|---|---|---|---|---|---|---|---|---|
| 1 | 10.0 | 75 | 3 | | 5 | 3 | | 3 | 1 |
| 2 | 3.5 | 80 | | 6 | | | | | 5 |
| 3 | 2.0 | 90 | 7 | | | 7 | 0.5 | | |
| 4 | 6.0 | 65 | | | 5 | | | 2 | |
| 5 | 4.0 | 70 | | 10 | 4 | 1 | | 4 | 11 |

TABLE X

| Ex. no. | Dye | Water | PG | DEG | NMP | CET | TBT | TDG | BDL | PHO | 2P |
|---|---|---|---|---|---|---|---|---|---|---|---|
| 1 | 1.5 | 80 | 1 | 2 | 3 | 0.5 | 0.4 | | | 7 | 2 | 10 |
| 2 | 3.0 | 60 | | 4 | | | 2.0 | 0.5 | | | |
| 3 | 4.5 | 90 | | 3 | 6 | | | 7.0 | 1 | 3 | 2 |
| 4 | 3.0 | 95 | | 7 | | 4 | | 3 | | 0.5 | |
| 5 | 2.1 | 70 | 5 | 5 | 5 | 0.1 | 0.2 | 0.1 | 5 | 0.1 | 5 |

TABLE XI

| Ex. no. | Dye | Water | PG | DEG | NMP | CHL | PHO | 2P | PDL |
|---|---|---|---|---|---|---|---|---|---|
| 1 | 7.0 | 75 | 3 | | 5 | 3 | | 3 | 1 |
| 2 | 3.5 | 60 | | | 2 | | | | 5 |
| 3 | 2.0 | 90 | 7 | | | 7 | 1.5 | | 2 |
| 4 | 6.0 | 65 | | | 5 | | | 2 | |
| 5 | 4.0 | 70 | | 5 | 4 | 1 | | 4 | 12 |

What is claimed is:

1. At least one compound of Formula (1):

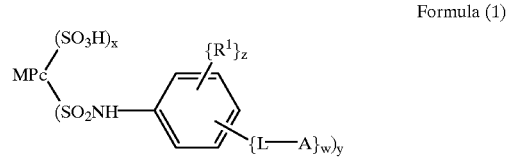

Formula (1)

which comprises any form of the compound; where:

M represents a metal or H;

Pc represents a phthalocyanine nucleus of Formula (2):

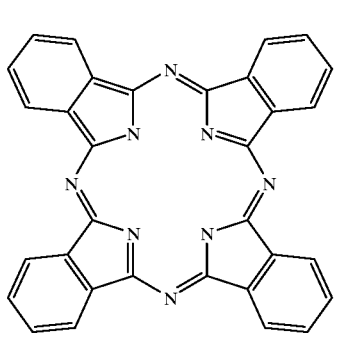

Formula (2)

L represents sulphonyl$C_{1-15}$alkylene;

A represents piperazinyl$C_{1-4}$alkylamino; N,N-di$C_{1-4}$ alkylamino$C_{1-4}$alkylamino; morpholino$C_{1-4}$alkylamino: and/or piperazinyl;

$R^1$ represents a group independently comprising at least one of: an optional substituent and optionally substituted $C_{1-15}$hydrocarbyl;

z represents an integer from 0 to 4; w represents an integer from 1 to 5; and the sum of w+z is from 1 to 5; and x and y each independently represent a non-zero number; and the mean of the sum of x+y is from about 1 to about 6; and where the optional substituents comprise at least one of: carboxy, sulpho, hydroxy, amino, mercapto, cyano, nitro and halo.

2. A compound according to claim 1 wherein M is Ni and/or Cu.

3. A compound according to claim 1 wherein M is Cu; L represents sulphonyl$C_{1-15}$alkylene; A comprises: piperazinyl$C_{1-4}$alkylamino; N,N-di$C_{1-4}$alkylamino$C_{1-4}$alkylamino; morpholino$C_{1-4}$alkylamino; and/or piperazinyl; z is 0; and x and y are both 2.

4. A compound according to claim 1 in the form of a salt.

5. A compound according to claim 4 wherein the salt comprises an alkali metal salt.

6. A compound according to claim 4 wherein the salt comprises a salt with ammonia or a volatile amine.

7. An ink suitable for use in ink jet printing, comprising a suitable medium and a colorant comprising a suitable compound of Formula (3):

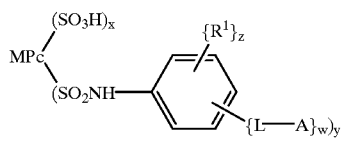

Formula (3)

which comprises any form of the compound where:

M represents Ni or Cu;

Pc represents a phthalocyanine nucleus of Formula (2) as defined in claim 1;

L represents sulphonyl$C_{1-15}$alkylene;

A represents piperazinyl$C_{1-4}$alkylamino; N,N-di$C_{1-4}$alkylamino$C_{1-4}$alkylamino; morpholino$C_{1-4}$alkylamino; and/or piperazinyl;

$R^1$ represents a group independently comprising at least one of: an optional substituent and optionally substituted $C_{1-15}$hydrocarbyl;

z represents an integer from 0 to 4; w represents an integer from 1 to 5; and the sum of w+z is from 1 to 5; and x and y each independently represent a non-zero number; and the mean of the sum of x+y is from about 1 to about 6;

where the optional substituents comprise at least one of: carboxy, sulpho, hydroxy, amino, mercapto, cyano, nitro and halo.

8. A process for printing an image on a substrate comprising applying to the substrate by means of an ink-jet printer an ink as described in claim 7.

9. A substrate printed by a process as claimed in claim 8, the substrate selected from the group consisting of one or more of: paper, an overhead projector slide and a textile material.

10. A process for the colouring a textile material with an ink as claimed in claim 7, the process comprising the steps of.

i) applying the ink to the textile material by ink-jet printing; and ii) heating the textile material at 50° C. to 250° C. to fix the ink on the material.

11. A textile material coloured with any ink as claimed in claim 7.

12. An ink according to claim 7 wherein the fluid medium comprises water or a mixture of water and an organic solvent.

13. An ink according to claim 7 wherein the fluid medium comprises water and a water-miscible organic solvent or a mixture of such solvents.

14. An ink according to claim 7 wherein the fluid medium comprises an organic solvent free from water.

\* \* \* \* \*